US012596486B2

(12) United States Patent
Jun et al.

(10) Patent No.: US 12,596,486 B2
(45) Date of Patent: Apr. 7, 2026

(54) STORAGE DEVICE AND STORAGE ADAPTER INCLUDING THE SAME

(71) Applicant: SAMSUNG ELECTRONICS CO., LTD., Suwon-si (KR)

(72) Inventors: Sang Hun Jun, Suwon-si (KR); Sung Chul Hur, Suwon-si (KR); Bumjun Kim, Suwon-si (KR); Jungmoo Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/756,018

(22) Filed: Jun. 27, 2024

(65) Prior Publication Data

US 2025/0138733 A1     May 1, 2025

(30) Foreign Application Priority Data

Oct. 26, 2023     (KR) ........................ 10-2023-0145041

(51) Int. Cl.
 G06F 12/00        (2006.01)
 G06F 3/06        (2006.01)
(52) U.S. Cl.
 CPC .......... G06F 3/0619 (2013.01); G06F 3/0656 (2013.01); G06F 3/0659 (2013.01); G06F 3/0679 (2013.01)

(58) Field of Classification Search
 None
 See application file for complete search history.

(56) References Cited

U.S. PATENT DOCUMENTS

| | | | |
|---|---|---|---|
| 6,229,440 B1 * | 5/2001 | Fairchild ............. | G11B 33/027 |
| | | | 361/679.33 |
| 8,661,551 B2 | 2/2014 | Chan et al. | |
| 8,879,241 B2 | 11/2014 | Lu et al. | |
| 10,055,596 B1 | 8/2018 | Czamara et al. | |
| 10,452,115 B2 | 10/2019 | Fernandes | |
| 10,990,553 B2 | 4/2021 | Rust et al. | |
| 11,102,908 B1 | 8/2021 | Komori et al. | |
| 2019/0236044 A1 * | 8/2019 | Rust ........................ | G06F 13/16 |

FOREIGN PATENT DOCUMENTS

JP          3423891 B2     7/2003

* cited by examiner

*Primary Examiner* — Daniel D Tsui
(74) *Attorney, Agent, or Firm* — Sughrue Mion, PLLC

(57) ABSTRACT

A storage adapter includes a carrier and a storage device. The storage device stores data and includes a buffer memory including a volatile memory, a nonvolatile memory, a memory controller that controls the buffer memory and the nonvolatile memory, and a mode signal generating circuit that generates a mode signal, based on a connection state of the storage device and the carrier. The carrier removably receives the storage device, and based on a level of the mode signal, the memory controller selectively performs a data dump operation such that the data stored in the buffer memory are stored in the nonvolatile memory.

19 Claims, 21 Drawing Sheets

【FIG. 1】
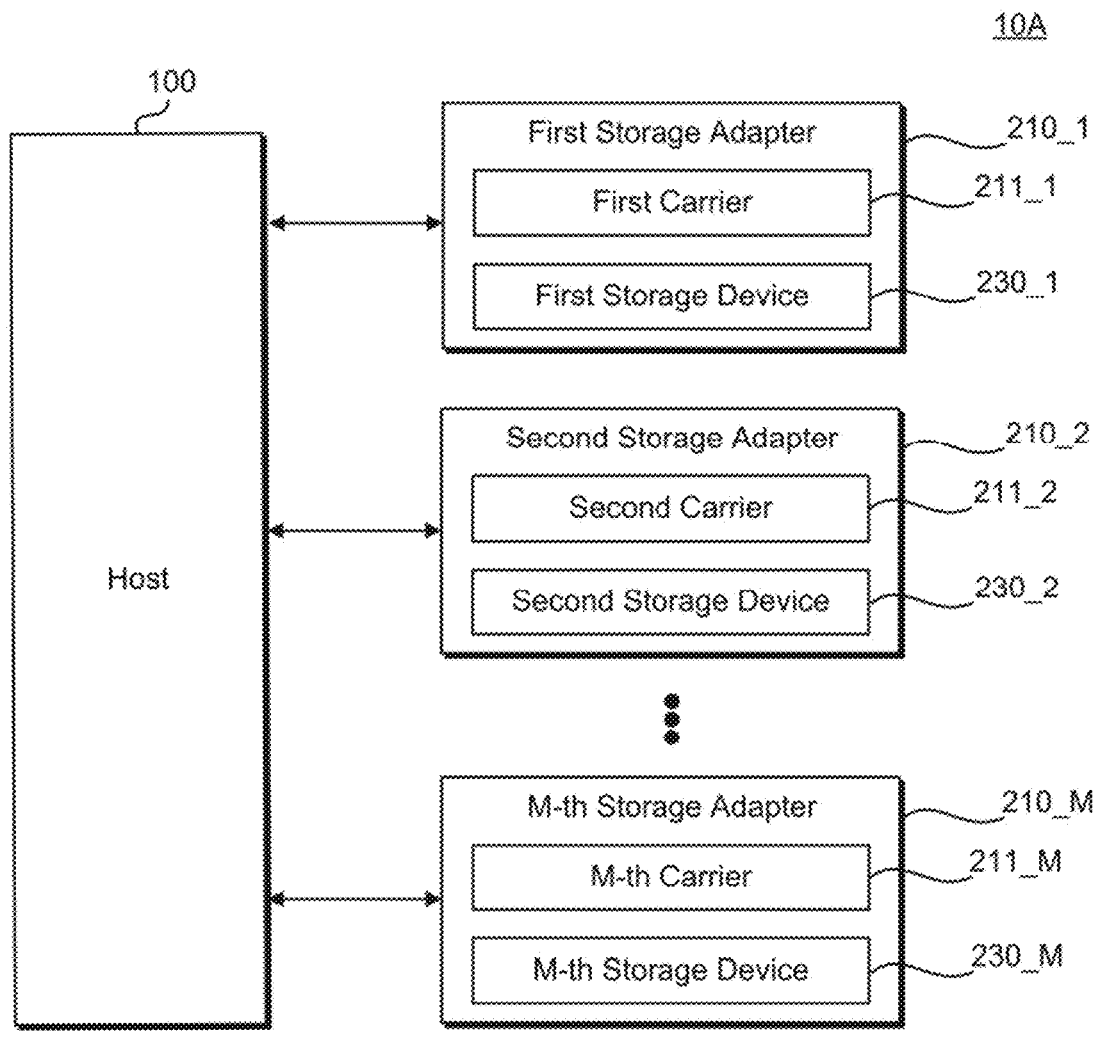

【FIG. 2A】
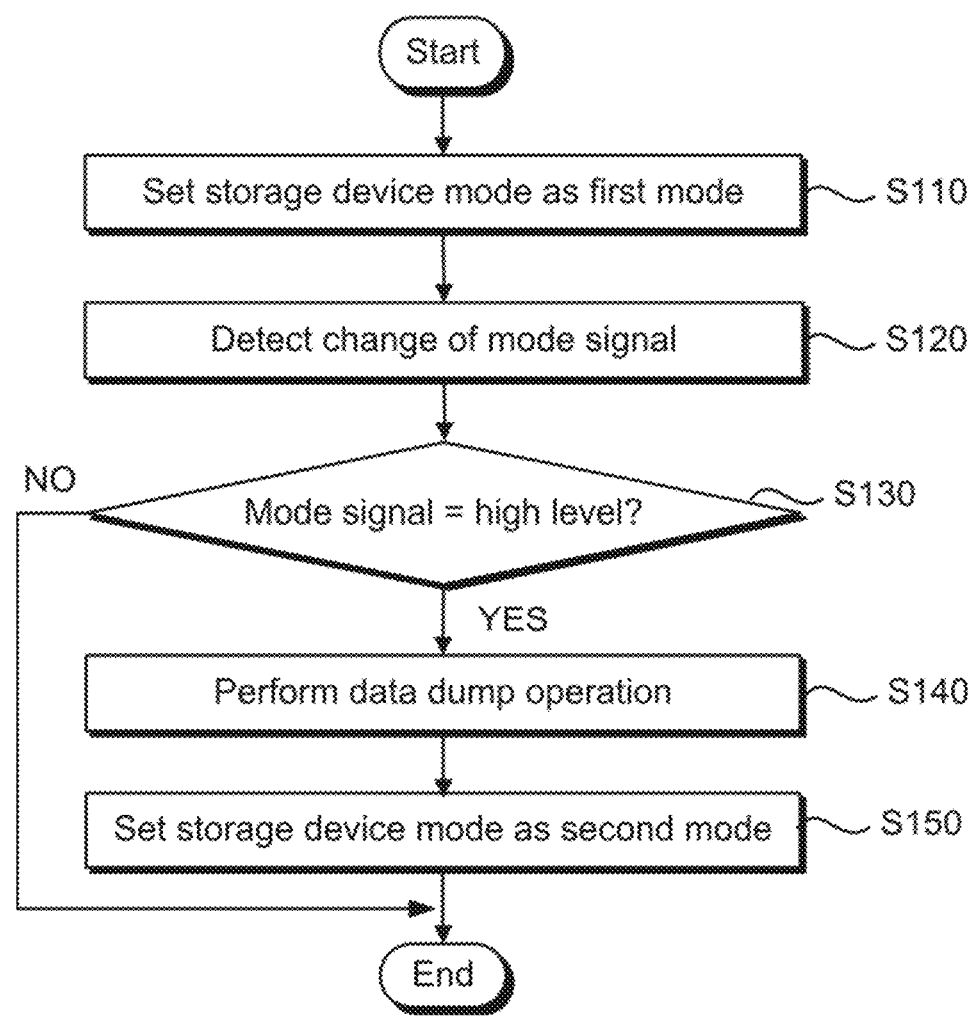

【FIG. 2B】
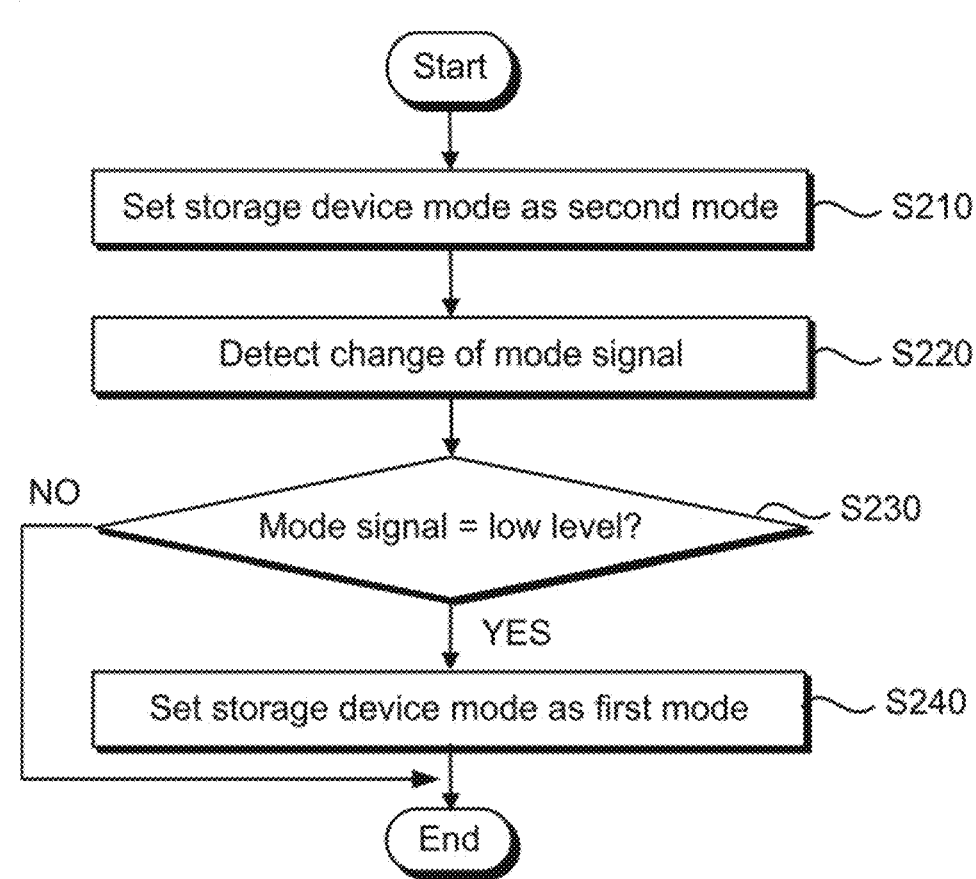

【FIG. 3A】
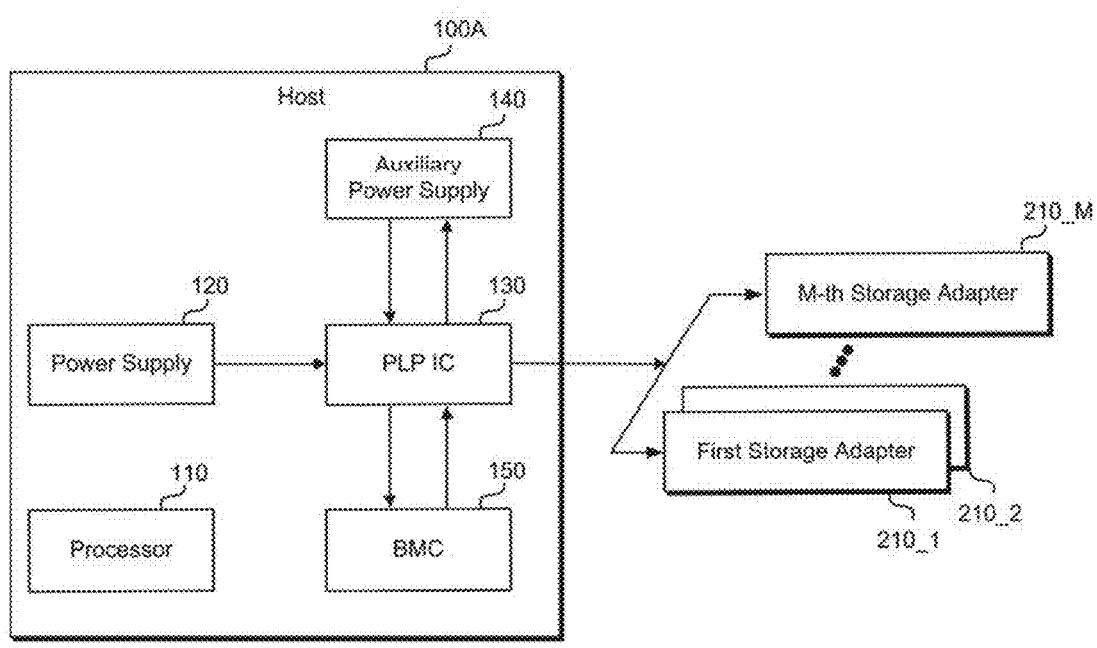

【FIG. 3B】
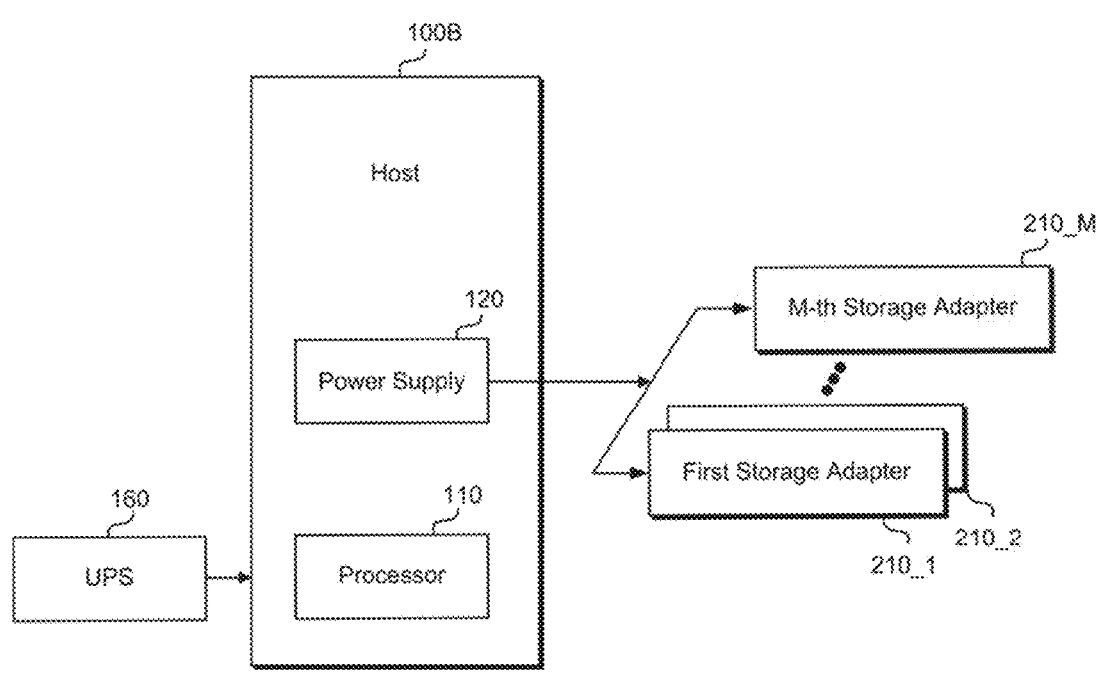

【FIG. 4】
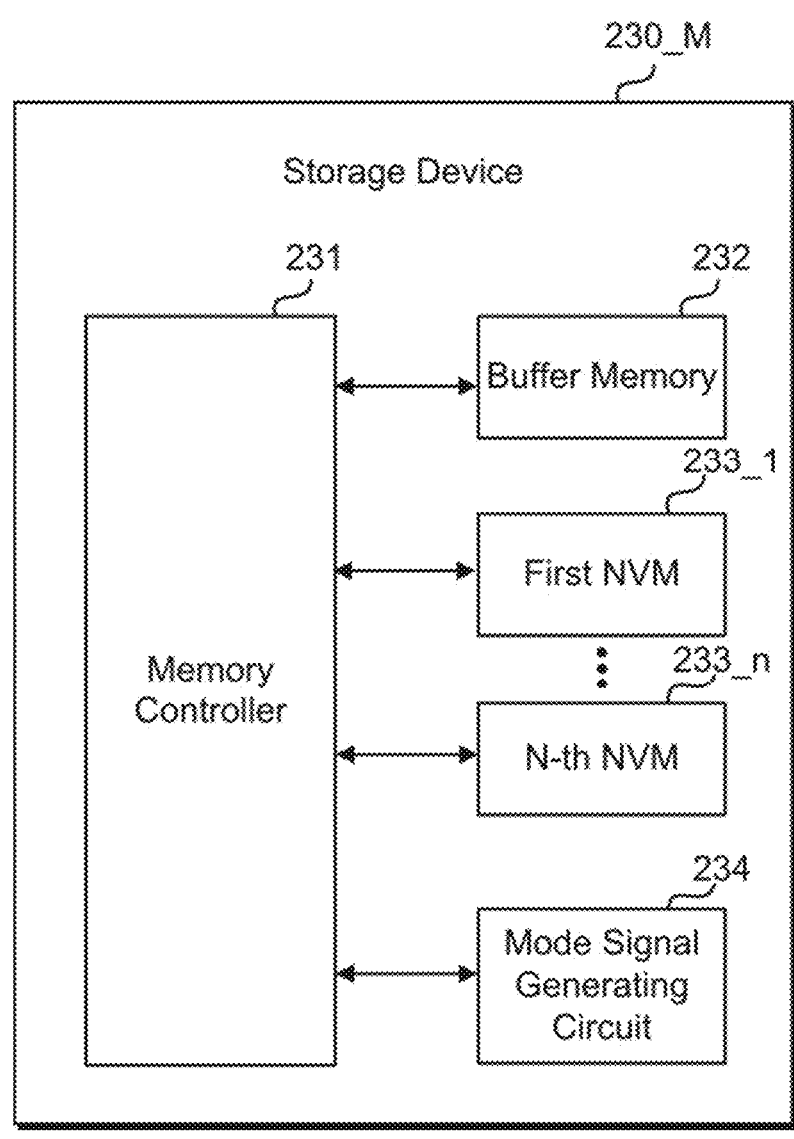

【FIG. 5】
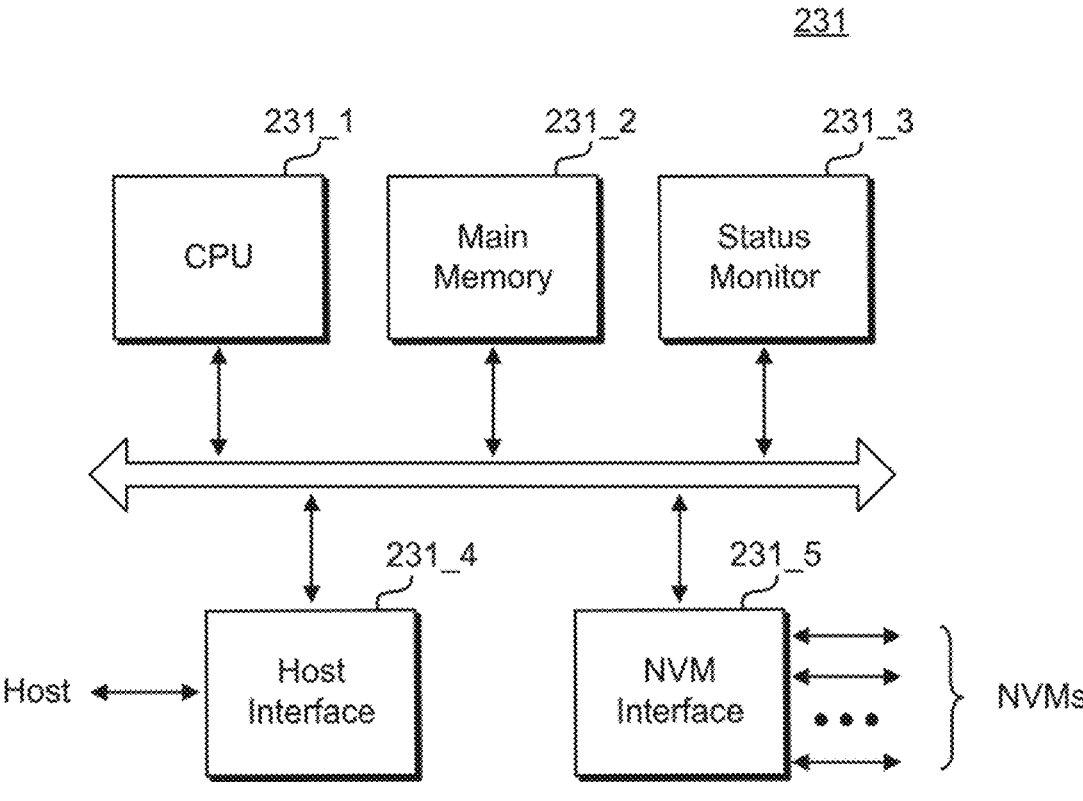

[FIG. 6]
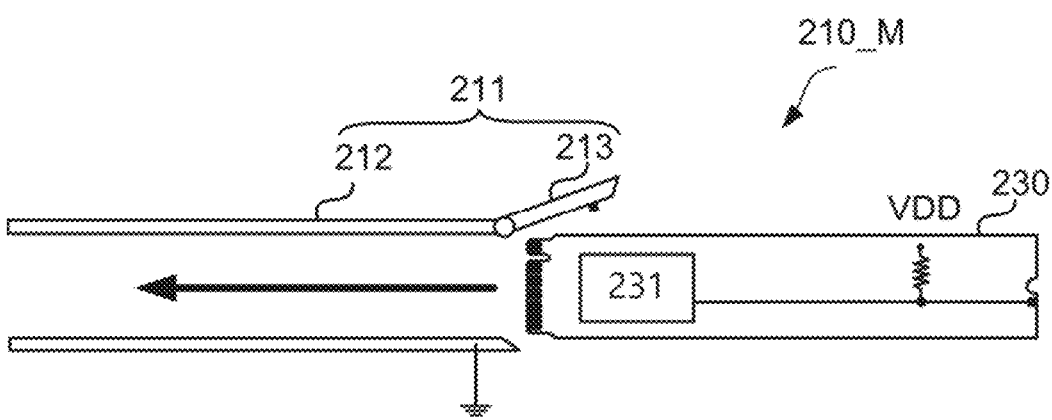

【FIG. 7】
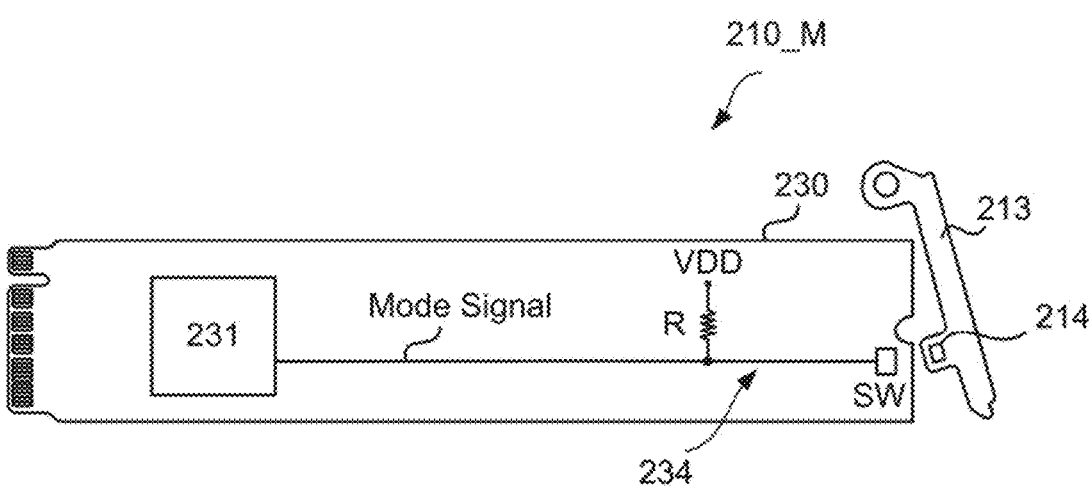

[FIG. 8A]
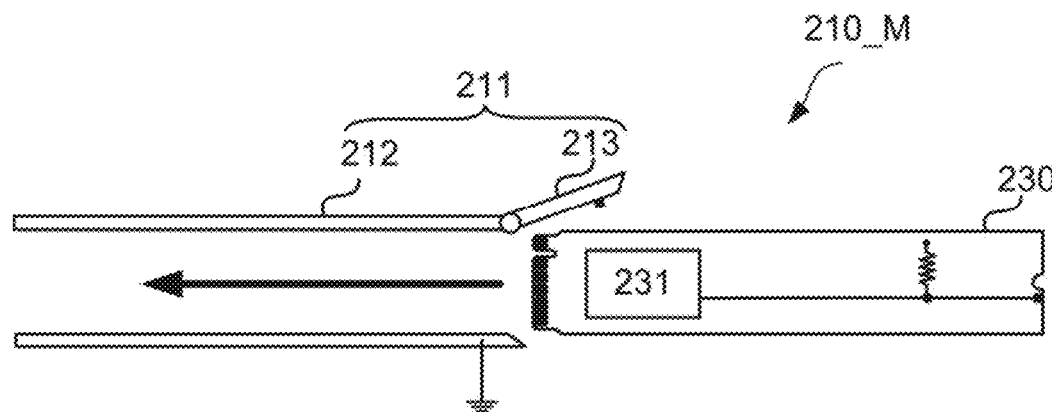

[FIG. 8B]
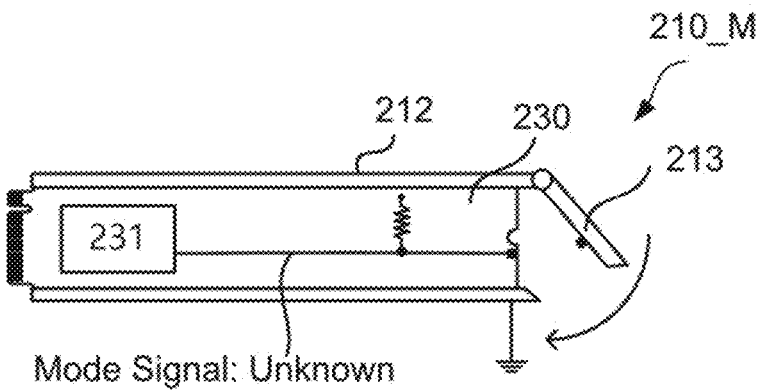
Mode Signal: Unknown

[FIG. 8C]
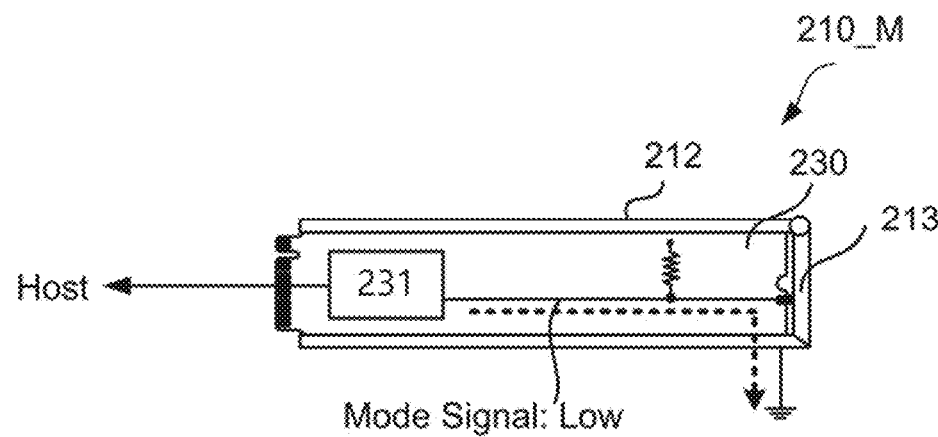

[FIG. 8D]
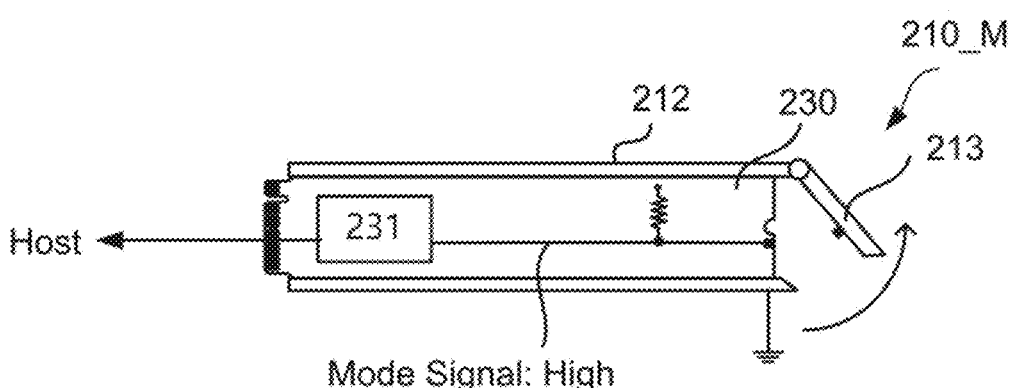
Mode Signal: High

[FIG. 8E]
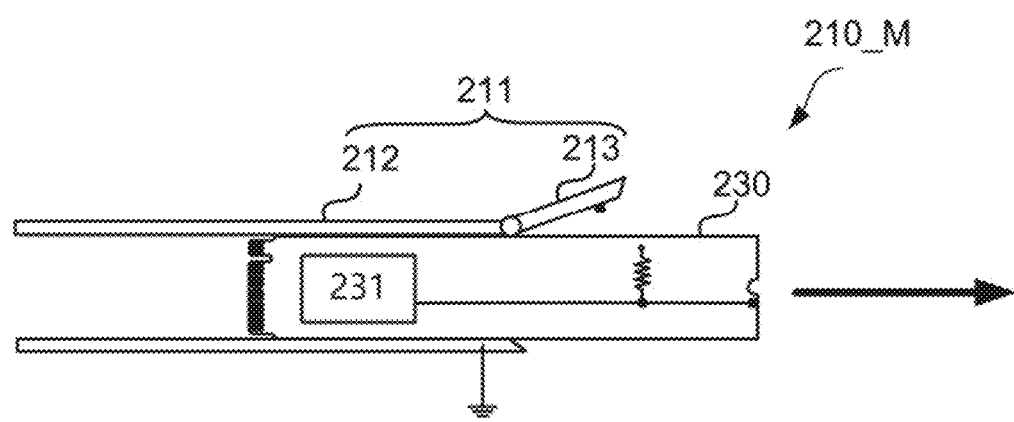

【FIG. 9】
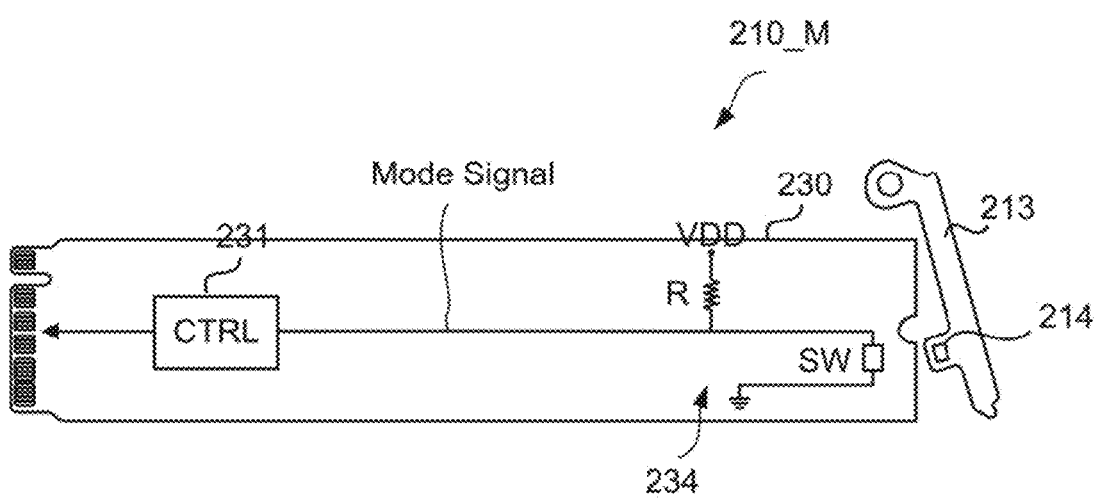

【FIG. 10】
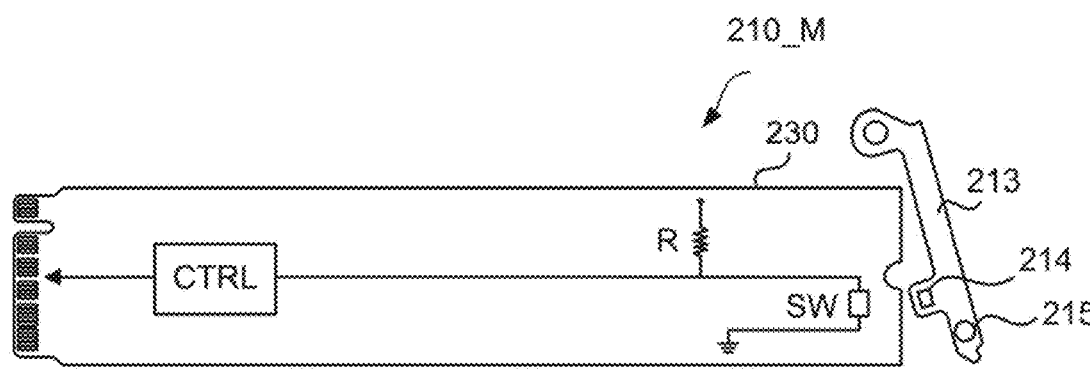

【FIG. 11A】
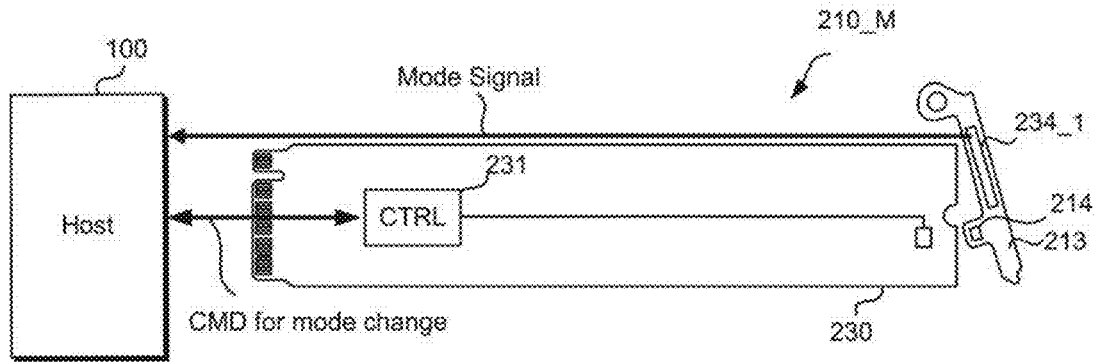

【FIG. 11B】
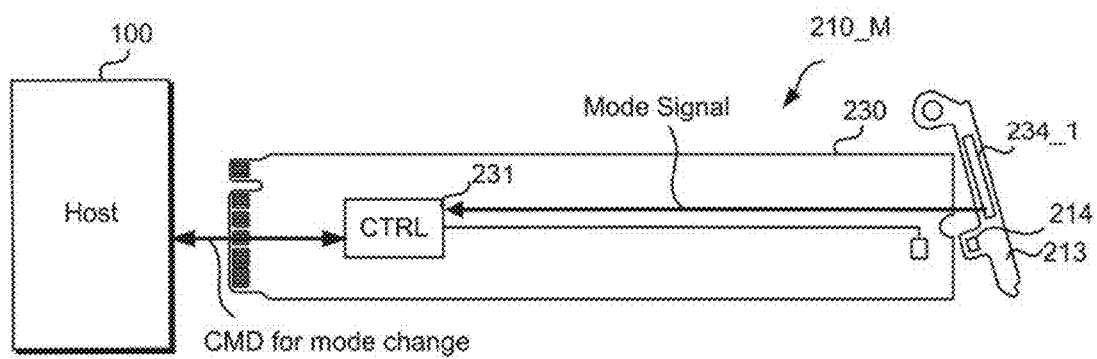

【FIG. 12】
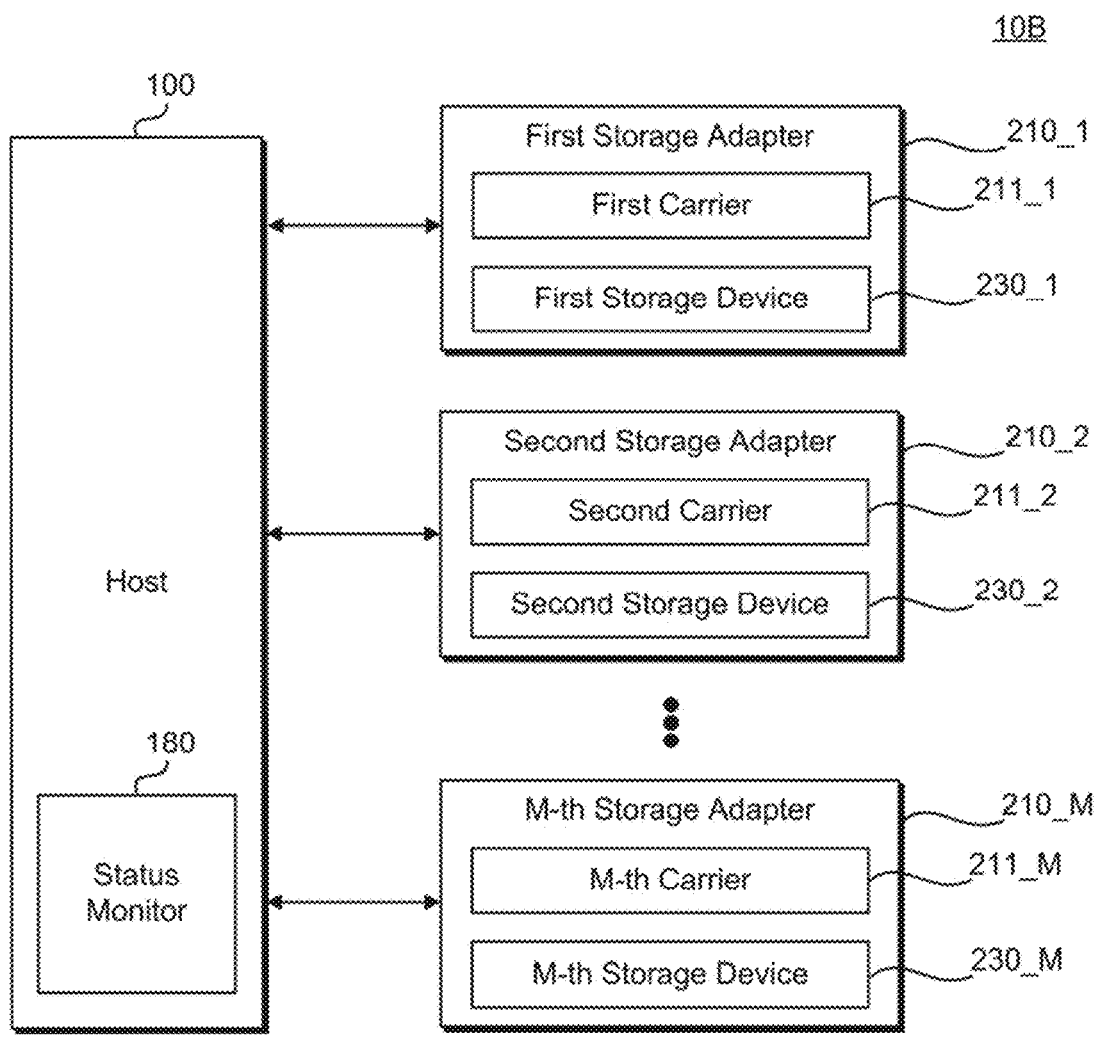

【FIG. 13】
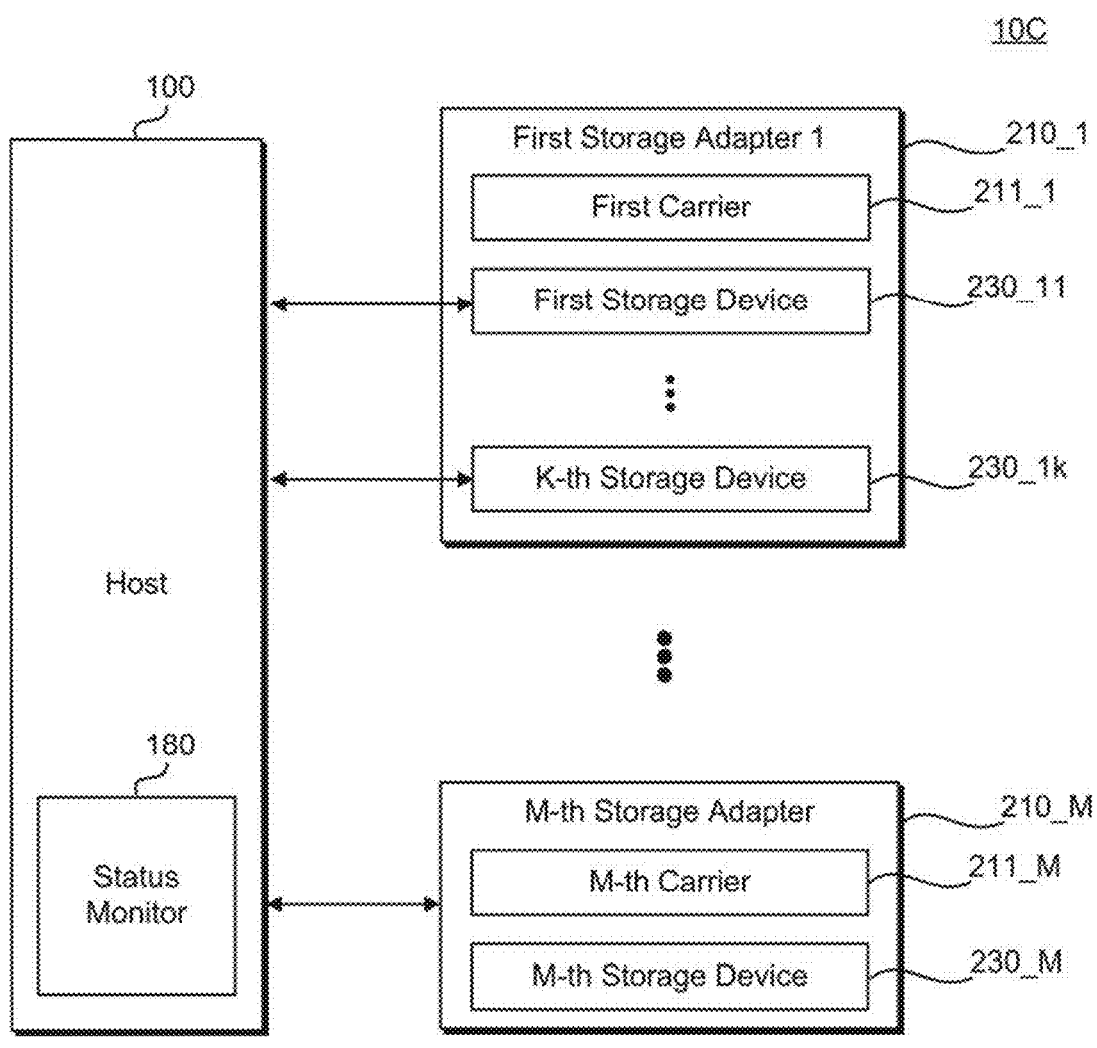

【FIG. 14】
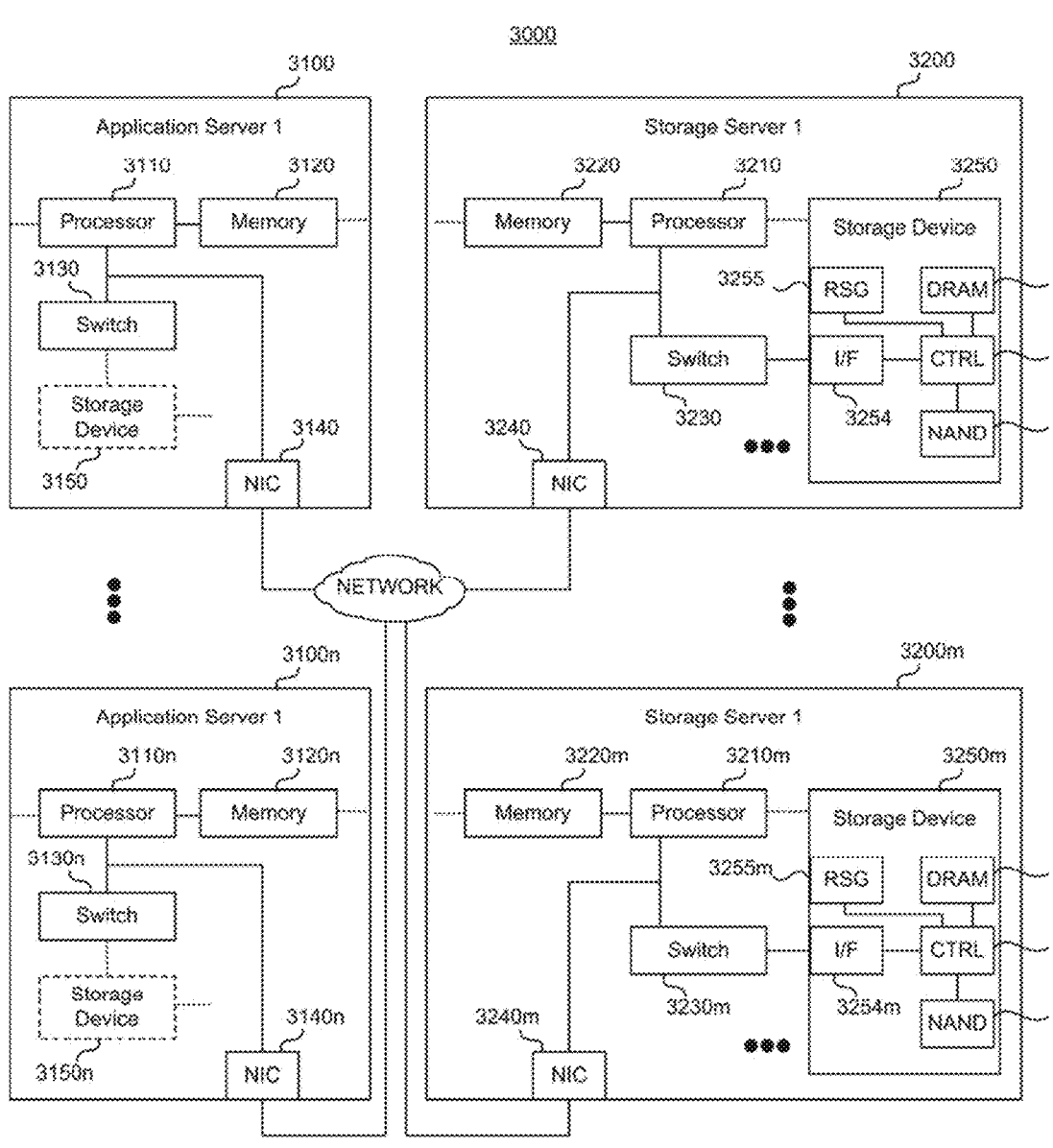

STORAGE DEVICE AND STORAGE ADAPTER INCLUDING THE SAME

CROSS-REFERENCE TO RELATED APPLICATION

This application claims priority under 35 U.S.C. § 119 to Korean Patent Application No. 10-2023-0145041 filed on Oct. 26, 2023, in the Korean Intellectual Property Office, the disclosure of which being incorporated by reference herein in its entirety.

BACKGROUND

Devices, apparatuses, and methods consistent with the present disclosure relate to a storage device, a storage adapter including the same, and an operation method of the storage device.

A solid state drive (hereinafter, referred to as an "SSD") stores user data in a nonvolatile storage medium such as a flash memory device. As the demand for the SSD increases, nowadays the SSD is being used in various fields for various purposes. For example, the SSD may be used by an end user and may also be used in a server and a data center.

A plurality of SSDs may be installed in a storage device which is used in a data center or a server. In some cases, contrary to a user's intention, an SSD may be suddenly physically removed or separated from the storage device, or power which is supplied to the SSD may be suddenly blocked (or turned off). That is, a sudden power-off situation may occur.

SUMMARY

It is an aspect to provide a storage device capable of preventing the loss of data in a sudden power-off situation and a storage adapter including the same.

According to an aspect of one or more embodiments, there is provided a storage adapter comprising a carrier, and a storage device configured to store data. The storage device comprises a buffer memory including a volatile memory; at least one nonvolatile memory; a memory controller configured to control the buffer memory and the at least one nonvolatile memory; and a mode signal generating circuit configured to generate a mode signal, based on a connection state of the storage device and the carrier, wherein the carrier is configured to removably receive the storage device. Based on a level of the mode signal, the memory controller selectively performs a data dump operation such that the data stored in the buffer memory are stored in the at least one nonvolatile memory.

According to another aspect of one or more embodiments, there is provided a storage device which is removably installed in a carrier, the storage device comprising a buffer memory including a volatile memory; at least one nonvolatile memory; a memory controller configured to control the buffer memory and the at least one nonvolatile memory; and a mode signal generating circuit configured to generate a mode signal based on a connection state of the storage device and the carrier, wherein, based on a level of the mode signal, the memory controller selectively performs a data dump operation such that data stored in the buffer memory are stored in the at least one nonvolatile memory.

According to yet another aspect of one or more embodiments, there is provided an operation method of a storage device which is removably received in a carrier, the operation method comprising setting a use mode of the storage device as a first mode; detecting a level of a mode signal generated based on a connection state of the storage device and the carrier; and selectively performing a data dump operation based on the level of the mode signal such that data stored in a buffer memory of the storage device are stored in a nonvolatile memory of the storage device.

BRIEF DESCRIPTION OF THE FIGURES

The above and other aspects will become apparent by describing in detail embodiments thereof with reference to the accompanying drawings, in which:

FIG. 1 is a block diagram of a storage system according to an embodiment;

FIG. 2A is a flowchart illustrating an example of an operation of the storage system of FIG. 1, according to an embodiment;

FIG. 2B is a flowchart illustrating an example of an operation of the storage system of FIG. 1, according to an embodiment;

FIG. 3A is a diagram illustrating an example of a host of the storage system of FIG. 1, according to an embodiment;

FIG. 3B is a diagram illustrating an example of a host of the storage system of FIG. 1, according to an embodiment;

FIG. 4 is a block diagram illustrating an example of a storage device of the storage system of FIG. 1, according to an embodiment;

FIG. 5 is a block diagram illustrating an example of a memory controller of the storage device of FIG. 4, according to an embodiment;

FIG. 6 is a block diagram illustrating an example of a storage adapter of the storage system of FIG. 1 according to an embodiment;

FIG. 7 is a diagram illustrating an example of physical connection between an opening and closing lever and a storage device of the storage adapter of FIG. 6 in detail, according to an embodiment;

FIGS. 8A to 8E are diagrams illustrating examples in which a storage device is installed in a carrier of the storage adapter of FIG. 6 and is taken out, according to various embodiments;

FIG. 9 is a diagram illustrating an example of a storage adapter of the storage system of FIG. 1, according to an embodiment;

FIG. 10 is a diagram illustrating an example of a storage adapter of the storage system of FIG. 1, according to an embodiment;

FIGS. 11A and 11B are diagrams illustrating examples of a storage adapter of the storage system of FIG. 1, according to various embodiments;

FIG. 12 is a block diagram of a storage system according to an embodiment;

FIG. 13 is a block diagram of a storage system according to an embodiment; and

FIG. 14 is a diagram illustrating an example of a data center to which a storage system according to various embodiments may be applied.

DETAILED DESCRIPTION

To prevent the loss of data stored in a volatile memory in a sudden power-off (SPO) situation, a storage device may perform a data flushing operation such that the data stored in the volatile memory are dumped on a nonvolatile memory. However, in a hot plug-out situation in which the SSD is suddenly physically separated, the storage device fails to secure a minimum of time necessary to dump the data of the volatile memory, thereby causing the loss of data.

Below, various embodiments will be described in detail and clearly to such an extent that an ordinary one in the art easily carries out the various embodiments.

FIG. 1 is a block diagram of a storage system according to an embodiment.

Referring to FIG. 1, a storage system 10A may include a host 100 and a plurality of storage adapters 210_1 to 210_M.

The storage system 10A may be an electronic device or electronic system. For example, the storage system 10A may be implemented with a server, a data center, a personal computer (PC), a network-attached storage, an Internet of Things (IoT) device, or a portable electronic device. The portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, etc.

The host 100 may communicate with the storage adapters 210_1 to 210_M through various interfaces. For example, in an embodiment, the host 100 may be implemented with an application processor (AP) or a system-on-a-chip (SoC). In some embodiments, for example, the host 100 may be implemented with an integrated circuit or a main board, but embodiments are not limited thereto.

The host 100 may transmit a write request and a read request to the storage adapters 210_1 to 210_M. Each of the storage adapters 210_1 to 210_M may include a storage device. In an embodiment, the storage adapters 210_1 to 210_M may store the data received from the host 100 in response to the write request. In an embodiment, in response to the read request, the storage adapters 210_1 to 210_M may read the stored data and may transmit the read data to the host 100.

The host 100 may manage the power for the storage adapters 210_1 to 210_M. For example, in an embodiment, the host 100 may include a power supply and may supply the power to each of the storage adapters 210_1 to 210_M. In an embodiment, for example, the host 100 may include an auxiliary power source and may supply the power to each of the storage adapters 210_1 to 210_M. In an abnormal power supply situation (e.g., an SPO situation), the host 100 may supply the auxiliary power to each of the storage adapters 210_1 to 210_M.

In an embodiment, the host 100 may determine a use mode of each of the storage adapters 210_1 to 210_M, based on a mode signal of each of the storage adapters 210_1 to 210_M.

For example, in an embodiment, when the mode signal of the storage adapter is at a low level, the host 100 may set the use mode of the storage adapter as a first mode. In an embodiment, for example, the first mode may refer to a mode in which the storage adapter is used as an SSD for server. In other words, for example, the first mode may be a mode in which the storage device 230 is physically inserted into the storage adapter 210 for use in a server.

As another example, in an embodiment, when the mode signal of the storage adapter is at a high level, the host 100 may set the use mode of the storage adapter as a second mode. In an embodiment, for example, the second mode may refer to a mode in which the storage adapter is used as an SSD for a user. In other words, for example, the second mode may be a mode in which the storage device 230 is physically removed from the storage adapter 210 for use by an end user.

However, embodiments are not limited thereto. For example, according to an embodiment, levels of the mode signal and use modes corresponding thereto may be variously set. In some embodiments, more than two use modes may be set.

Each of the plurality of storage adapters 210_1 to 210_M may communicate with the host 100. According to an embodiment, a network interface between each of the plurality of storage adapters 210_1 to 210_M and the host 100 may include one of the following interfaces: CLX (Compute Express Link), USB (Universal Serial Bus), SCSI (Small Computer System Interface), PCI express, ATA, PATA (Parallel ATA), SATA (Serial ATA), SAS (Serial Attached SCSI), UFS (Universal Flash Storage), NVMeoF being a Fibre Channel (FC)-based interface, Ethernet, Infiniband, RoCE, iWARF, and CXL-based interfaces (i.e., CXL.mem, CXL.io, and CXL.cashe). However, embodiments are not limited thereto.

Each of the plurality of storage adapters 210_1 to 210_M may include a carrier and a storage device. For example, in an embodiment, the plurality of storage adapters 210_1 to 210_M may include a first storage adapter 210_1, a second storage adapter 210_2, . . . , and an M-th storage adapter 210_M. The first storage adapter 210_1 may include a first carrier 211_1 and a first storage device 230_1, the second storage adapter 210_2 may include a second carrier 211_2 and a second storage device 230_2, and the M-th storage adapter 210_M may include an M-th carrier 211_M and an M-th storage device 230_M.

The carrier may form at least a portion of the outer housing of the storage adapter. In this case, the storage device may be installed inside the carrier. For example, the carrier may be implemented to protect the storage device from an external impact. In this case, the storage device may not be exposed to the outside in a state in which the storage device is installed inside the carrier.

However, embodiments are not limited thereto. For example, the carrier may be implemented in various forms. For example, in an embodiment, the carrier may be implemented to include a minimum of components capable of fixing a memory device therein. In this case, in some embodiments, at least a portion of a memory device may be exposed to the outside in a state in which the memory device is installed inside the carrier.

The storage device may be implemented to store data. For example, in some embodiments, the storage device may include a solid state drive (SSD), an embedded UFS (Universal Flash Storage), or an eMMC (embedded Multi-Media Card). In some embodiments, the storage device may be an external memory capable of being attached to or detached from an electronic device. For example, in some embodiments, the storage device may include a UFS memory card, a CF (Compact Flash) card, an SD (Secure Digital) card, a Micro-SD (MicroSecure Digital) card, a Mini-SD (Mini Secure Digital) card, an xD (extreme Digital) card, a memory stick, but embodiments are not limited thereto.

For convenience of description that follows, it is assumed that the storage device is an SSD.

In an embodiment, each of the plurality of storage adapters 210_1 to 210_M may generate the mode signal of the high level or the low level based on a connection state of the carrier and the storage device. According to an embodiment, each of the plurality of storage adapters 210_1 to 210_M may provide the generated mode signal to the host 100. In some embodiments, the host 100 may monitor the mode signal of each of the plurality of storage adapters 210_1 to 210_M and may detect a change of the mode signal.

In an embodiment, the connection state of the carrier and the storage device may be variously defined depending on a way to implement the carrier and/or the storage device.

In an embodiment, the connection state of the carrier and the storage device may be defined as whether a physical contact is made. In an embodiment, the connection state of the carrier and the storage device may be defined as whether an electrical contact is made. For example, in an embodiment, the carrier may include an opening and closing module, and the storage device may be inserted into the inside of the carrier through the opening and closing module of the carrier, so as to be installed therein. In this case, the connection state of the carrier and the storage device may be defined as whether the physical or electrical contact is made between the opening and closing module of the carrier and the storage device.

For example, in an embodiment, when the opening and closing module of the carrier is in a closed state, the storage adapter may generate the mode signal of the low level. In this case, the host 100 may determine that the storage device is in a state of being stably installed in the carrier. In an embodiment, the host 100 may set the use mode of the storage adapter as the first mode (i.e., the SSD mode for server) based on the mode signal of the low level.

In an embodiment, when the opening and closing module of the carrier is in an open state, the storage adapter may generate the mode signal of the high level. In this case, the host 100 may determine that the storage device is in a state of being unstably installed in the carrier or that a hot plug-out situation occurs in the storage device. in an embodiment, the host 100 may set the use mode of the storage adapter as the second mode (i.e., an SSD mode for user) based on the mode signal of the high level. In this case, a data dump operation is performed in which data stored in the volatile memory of the storage device are quickly moved to the nonvolatile memory of the storage device, and thus, the loss of data may be prevented even though the hot plug-out occurs.

In detail, in the case of a hot plug-out situation in which a storage device is physically and suddenly separated from a host, a related art storage device fails to secure a time necessary to perform the data dump operation, resulting in the loss of data stored in the volatile memory of the storage device. In particular, in the case of a related art storage device which does not include a separate auxiliary power source therein, the data stored in the volatile memory is inevitably lost in the hot plug-out situation. Accordingly, in related art cases, the storage device that does not include the separate auxiliary power source therein has a disadvantage in that it is difficult to use the storage device as an SSD for server, which requires high reliability.

In contrast, each of the plurality of storage adapters 210_1 to 210_M according to an embodiment may include the carrier in which the storage device is installed and which includes the opening and closing module, in addition to the storage device. In this case, to physically separate the storage device, an operation of opening the opening and closing module of the carrier has to be first performed, which causes a given time delay. In other words, when the storage device is physically separated from the carrier, a point in time when the storage device is physically separated may be delayed as much as a given time due to the operation of opening the opening and closing module of the carrier. This configuration may be equally applied to the hot plug-out situation, and the delay time may be a time sufficient to perform the data dump operation.

The storage system 10A according to an embodiment may perform the data dump operation by using the delay time. In other words, the storage system 10A may perform the data dump operation during the delay time. That is, the mode signal of each of the plurality of storage adapters 210_1 to 210_M may be changed depending on the physical connection state of the carrier and the storage device of the storage adapter. Based on whether the mode signal is changed, the host 100 may allow each storage device to perform the data dump operation. Accordingly, important data stored in the storage device may be safely backed up even in the hot plug-out situation.

Because the data dump operation is performed during the above delay time before the hot plug-out event occurs, the storage device according to an embodiment does not need to have an auxiliary power source. That is, the storage device may perform the data dump operation regardless of whether the auxiliary power source is internally provided.

Accordingly, when the mode signal is at the low level, the storage device according to an embodiment may be used as an SSD for server which requires high reliability. The storage device according to an embodiment may perform the data dump operation when the mode signal changes from the low level to the high level and may then be used as an SSD for an end user. That is, the storage device according to an embodiment may be used as an SSD for server, as well as an SSD for user, regardless of whether the auxiliary power source is internally provided.

FIG. 2A is a flowchart illustrating an example of an operation of the storage system 10A of FIG. 1, according to an embodiment. For convenience of description, below, operations of the host 100 and the M-th storage adapter 210_M will be mainly described.

In operation S110, the use mode of the storage device 230_M may be set as the first mode.

For example, the storage device 230_M and the carrier 211_M of the storage adapter 210_M may be in a state of being physically or electrically connected. In this case, the storage adapter 210_M may generate the mode signal of the low level. The host 100 may determine that the storage device 230_M is in a state of being stably installed in the carrier 211_M, based on the mode signal of the low level and may set the use mode of the storage adapter 210_M as the first mode (i.e., the SSD mode for the server).

In operation S120, the change of the mode signal may be detected. In operation S130, whether the level of the mode signal is the high level may be checked.

For example, the physical or electrical connection between the storage device 230_M and the carrier 211_M of the storage adapter 210_M may be released. In this case, the mode signal of the storage adapter 210_M may change from the low level to the high level. The host 100 may detect the change of the mode signal. When it is determined that the mode signal is at the high level (operation S130, YES), the host 100 may determine that the storage device 230_M is in a state of being unstably installed in the carrier 211_M or that the hot plug-out is capable of occurring.

When the mode signal is at the high level (operation S130, YES), the data dump operation may be performed in operation S140.

For example, the storage device 230_M of the storage adapter 210_M may perform the data dump operation such that data stored in the volatile memory of the storage device 230_M are stored in the nonvolatile memory of the storage device 230_M. The data dump operation may be performed through the delay time which is based on the physical or electrical connection between the storage device 230_M and the carrier 211_M. Because the data dump operation is capable of being performed within a very short time, the data dump operation may be sufficiently performed during the delay time.

In operation S150, the use mode of the storage device 230_M may be set as the second mode.

For example, the host 100 may set the use mode of the storage adapter 210_M as the second mode (i.e., the SSD mode for the user) based on the mode signal of the high level. Accordingly, the storage device 230_M may be used in the SSD mode for the user in a state where the storage device 230_M is in a state of being unstably installed in the carrier 211_M or in a state where the hot plug-out is capable of occurring.

As described above, depending on the level of the mode signal, the use mode of the storage device 230_M according to an embodiment may be changed from the first mode (e.g., the SSD mode for the server) to the second mode (e.g., the SSD mode for the user).

When the mode signal is not at the high level (operation S130, NO), the process may end.

FIG. 2B is a flowchart illustrating an example of an operation of the storage system 10A of FIG. 1, according to an embodiment. For convenience of description, below, operations of the host 100 and the M-th storage adapter 210_M will be mainly described.

In operation S210, the use mode of the storage device 230_M may be set as the second mode.

For example, the storage device 230_M and the carrier 211_M of the storage adapter 210_M may be in a state of being physically or electrically separated from each other. In this case, the storage adapter 210_M may generate the mode signal of the high level. The host 100 may determine that the storage device 230_M is in a state of being unstably installed in the carrier 211_M, based on the mode signal of the high level and may set the use mode of the storage adapter 210_M as the second mode (e.g., the SSD mode for the user).

In operation S220, the change of the mode signal may be detected. In operation S230, whether the level of the mode signal is the low level may be checked.

For example, when the storage device 230_M and the carrier 211_M of the storage adapter 210_M are physically or electrically connected stably, the mode signal of the storage adapter 210_M may switch from the high level to the low level. The host 100 may detect the change of the mode signal. When it is determined that the mode signal is at the low level (operation S230, YES), the host 100 may determine that the storage device 230_M is in a state of being stably installed in the carrier 211_M.

In operation S240, the use mode of the storage device 230_M may be set as the second mode.

For example, the host 100 may set the use mode of the storage adapter 210_M as the first mode (i.e., the SSD mode for the server) based on the mode signal of the low level. Accordingly, the storage device 230_M may be used as an SSD for server, which requires high reliability.

When it is determined that the mode signal is not at the low level (operation S230, NO), the process may end.

As described above, depending on the level of the mode signal, the use mode of the storage device 230_M according to an embodiment may be changed from the second mode (i.e., the SSD mode for user) to the first mode (i.e., the SSD mode for user).

As described with reference to FIGS. 2A and 2B, a storage device included in a storage adapter according to an embodiment may be used as an SSD for the server as well as an SSD for the user.

FIG. 3A is a diagram illustrating an example of the host 100 of the storage system of FIG. 1, according to an embodiment.

Referring to FIG. 3A, a host 100A according to an embodiment may supply the power to the storage adapters 210_1 to 210_M. For example, in an embodiment, the host 100A may include a processor 110, a power supply 120, a power loss protection integrated circuit (PLP IC) 130, an auxiliary power supply 140, and a baseboard management controller (BMC) 150.

The processor 110 may control an overall operation of the host 100A. The processor 110 may include a microprocessor, microcontroller, application specific integrated processor, central processing unit (CPU) or the like. While a single processor is illustrated in the example of FIG. 3A, in some embodiments the processor 110 may include a plurality of processors.

The power supply 120 may supply the power to all the circuits of the host 100A through a main board. For example, the power supply 120 may provide a main power to the power loss protection integrated circuit 130.

The power loss protection integrated circuit 130 may manage the supply of the power to the storage adapters 210_1 to 210_M. For example, the power loss protection integrated circuit 130 may supply the main power of the power supply 120 to the storage adapter 210_M. The power loss protection integrated circuit 130 may supply the main power of the power supply 120 to the auxiliary power supply 140.

The auxiliary power supply 140 may be charged by the power supplied from the power loss protection integrated circuit 130. As an example, in an embodiment, the auxiliary power supply 140 may include a capacitor, a super capacitor, and/or a rechargeable battery.

The baseboard management controller (BMC) 150 may monitor the status of the storage system 10A and may perform a management operation for the storage adapters 210_1 to 210_M.

According to an embodiment, the host 100A may supply the power to the storage adapters 210_1 to 210_M and may manage the supply of the power to the storage adapters 210_1 to 210_M. For example, when the sudden power-off event occurs, the host 100A may supply the power to the storage adapters 210_1 to 210_M by using the auxiliary power. In an embodiment, for example, when the hot plug-out event occurs, by using the delay time described above, the host 100A may perform the data dump operation such that data stored in a volatile memory of a storage adapter in which the hot plug-out is capable of occurring are moved to a nonvolatile memory thereof.

According to the above description, even though a storage device corresponds to an SSD where an auxiliary power source is not internally included, the host 100A according to an embodiment may use the storage device as an SSD for a server as well as an SSD for a user.

FIG. 3B is a diagram illustrating an example of the host 100 of the storage system of FIG. 1, according to an embodiment. A host 100B of FIG. 3B is similar to the host 100A of FIG. 3A. Thus, the same or similar components may be marked by the same or similar reference numerals/signs, and additional description associated with the same or similar components will be omitted to avoid redundancy and for conciseness.

Referring to FIG. 3B, the host 100B according to an embodiment may supply the power to the storage adapters 210_1 to 210_M. For example, in an embodiment, the host 100B may include the processor 110 and the power supply 120, and an uninterrupted power supply (UPS) 160 may be provided outside the host 100B.

The processor 110 may control an overall operation of the host 100B.

The power supply 120 may supply the power to all the circuits of the host 100B through a main board. For example, the power supply 120 may provide the main power to the storage adapters 210_1 to 210_M.

The UPS 160 may provide an emergency power to the host 100B. For example, when the sudden power-off event and/or the hot plug-out event occurs, the UPS 160 may provide the emergency power to the host 100B.

According to an embodiment, the host 100B may supply the power to the storage adapters 210_1 to 210_M and may manage the supply of the power to the storage adapters 210_1 to 210_M. For example, when the sudden power-off event and/or the hot plug-out event occurs, the host 100B may supply the power to the storage adapters 210_1 to 210_M by using the emergency power of the UPS 160. Accordingly, data stored in a volatile memory of each storage adapter may be dumped into a nonvolatile memory thereof.

In particular, when the hot plug-out event occurs, by using the delay time described above, the host 100B may perform the data dump operation such that data stored in a volatile memory of a storage adapter in which the hot plug-out is capable of occurring are moved to a nonvolatile memory thereof.

According to the above description, even though a storage device corresponds to an SSD where an auxiliary power source is not internally included, the host 100B according to an embodiment may use the storage device as an SSD for the server as well as an SSD for the user.

FIGS. 3A and 3B are provided as an example, and a host according to an embodiment may be variously implemented.

FIG. 4 is a block diagram illustrating an example of a storage device of the storage system of FIG. 1, according to an embodiment. The M-th storage device 230_M is illustrated in FIG. 4 as an example.

Referring to FIG. the storage device 230_M may include a memory controller 231, a buffer memory 232, a plurality of nonvolatile memories (NVMs) 233_1 to 233_n, and a mode signal generating circuit 234. In an embodiment, the plurality of nonvolatile memories (NVMs) 233_1 to 233_n may include a first NVM 233_1, . . . , and an N-th NVM 233_n. For convenience of description, below, it is assumed that the mode signal generating circuit 234 is provided in the storage device 230_M.

The memory controller 231 may control an overall operation of the storage device 230_M. In an embodiment, the memory controller 231 may detect a level of the mode signal and may transmit information about the level of the mode signal to the host 100 (refer to FIG. 1). In an embodiment, the memory controller 231 may receive a command for the use mode of the storage device 230_M from the host 100 and may control the storage device 230_M to operate as one of an SSD for the server or an SSD for the user based on the command.

The buffer memory 232 may be implemented to temporarily store data. For example, the buffer memory 232 may be implemented to include a volatile memory. For example, the buffer memory 232 may include various DRAM devices such as a double data rate synchronous dynamic random access memory (DDR SDRAM), a DDR2 SDRAM, a DDR3 SDRAM, a DDR4 SDRAM, a DDR5 SDRAM, a DDR6 SDRAM, a low power double data rate (LPDDR) SDRAM, an LPDDR2 SDRAM, an LPDDR3 SDRAM, an LPDDR4 SDRAM, an LPDDR4X SDRAM, an LPDDR5 SDRAM, a graphics double data rate synchronous graphics random access memory (GDDR SGRAM), a GDDR2 SGRAM, a GDDR3 SGRAM, a GDDR4 SGRAM, a GDDR5 SGRAM, and a GDDR6 SGRAM. In an embodiment, the buffer memory 232 may be a stacked memory device, in which DRAM dies are stacked, such as a high bandwidth memory (HBM), an HBM2, or an HBM3.

Each of the nonvolatile memories 233_1 to 233-n may include a plurality of memory cells that store data. Each of the nonvolatile memories 233_1 to 233-n may include a plurality of memory blocks, and some or all of the plurality of memory blocks may include memory cells which do not support the overwrite operation like a flash memory. However, embodiments are not limited thereto. For example, in some embodiments, each of the nonvolatile memories 233_1 to 233-n may be implemented to include an RRAM, an FRAM, a PRAM, a TRAM, or an MRAM. In some embodiments, each of the memory blocks may have a two-dimensional structure or a three-dimensional structure. Memory cells of a memory block with the two-dimensional structure (or a horizontal (or planar) structure) may be formed in a direction parallel to a substrate. Memory cells of a memory block with the three-dimensional structure (or a vertical structure) may be formed in a direction perpendicular to the substrate.

The mode signal generating circuit 234 may generate the mode signal of the high level or the low level based on a connection state of the carrier 211_M (refer to FIG. 1) and the storage device 230_M.

For example, when the carrier 211_M and the storage device 230_M are physically or electrically connected to each other, the mode signal generating circuit 234 may generate the mode signal of the low level. In this case, the memory controller 231 may transmit information indicating that the level of the mode signal is the low level to the host 100, and the host 100 may set the use mode of the storage device 230_M as the SSD mode for the server. The memory controller 231 may receive the command for the use mode from the host 100 and may control the storage device 230_M to operate as an SSD for server.

For example, when the carrier 211_M and the storage device 230_M are physically or electrically separated from each other, the mode signal generating circuit 234 may generate the mode signal of the high level. That is, the mode signal generating circuit 234 may change the level of the mode signal from the low level to the high level. In this case, the memory controller 231 may transmit information indicating that the level of the mode signal is the high level to the host 100, and the host 100 may set the use mode of the storage device 230_M as the SSD mode for user. The memory controller 231 may receive the command for the use mode from the host 100 and may perform the data dump operation such that data stored in the buffer memory 232 are stored in at least one of the nonvolatile memories 233_1 to 233_n. Afterwards, the memory controller 231 may control the storage device 230_M to operate as an SSD for the user.

An example in which the storage device 230_M does not internally include an auxiliary power source is illustrated in FIG. 4. However, embodiments are not limited thereto. For example, in some embodiments, the storage device 230_M may internally include an auxiliary power source.

FIG. 5 is a block diagram illustrating an example of a memory controller of the storage device of FIG. 4, according to an embodiment.

Referring to FIG. 5, the memory controller 231 according to an embodiment may include a central processing unit (CPU) 231_1, a main memory 231_2, a status monitor 231_3, a host interface 231_4, and an NVM interface 231_5.

The central processing unit (CPU) 231_1 may provide the NVM interface 231_5 with various control information for the read/write operation on the plurality of storage adapters 210_1 to 210_M (refer to FIG. 1). The central processing unit 231_1 may operate based on software or an application which is provided for various control operations of the memory controller 231. For example, the central processing unit 231_1 may be configured to perform the data dump operation for managing the plurality of storage adapters 210_1 to 210_M.

The main memory 231_2 may store commands to be executed by the central processing unit 231_1 and data processed or to be processed by the central processing unit 231_1.

The status monitor 231_3 may monitor the mode signal, which is generated by the mode signal generating circuit 234, in real time or periodically. The status monitor 231_3 may provide a monitoring result to the central processing unit 231_1.

The host interface 231_4 may provide interfacing between the host 100 and the storage device 230_M. In other words, the host interface 231_4 may provide interfacing with the storage device 230_M, which corresponds to the bus format of the host 100.

The NVM interface 231_5 may provide interfacing with the plurality of nonvolatile memories (NVMs) 233_1 to 233_n.

In an embodiment, the status monitor 231_3 may monitor the mode signal generated by the storage device 230_M. When a change of the mode signal is detected, the status monitor 231_3 may notify the central processing unit 231_1 that the change of the mode signal is detected, and the central processing unit 231_1 may provide information about the change of the mode signal to the host 100 through the host interface 231_4. In this case, the host 100 may determine the use mode of the storage device 230_M and whether to perform the data dump operation based on the mode signal and may provide a command associated with a determination result to the storage device 230_M.

FIG. 6 is a block diagram illustrating an example of a storage adapter of the storage system of FIG. 1, according to an embodiment. An example in which a level of the mode signal changes depending on whether a carrier and a storage device physically contact each other is illustrated in FIG. 6.

For convenience of description, in FIG. 6, it is assumed that the carrier is implemented to contact opposite side surfaces of the storage device and the front surface and the rear surface of the storage device are exposed to the outside. However, this configuration is only an example, and embodiments are not limited thereto.

Referring to FIG. 6, the storage adapter 210_M may include a carrier 211 and a storage device 230, and the carrier 211 may include a bracket 212 and an opening and closing lever 213.

The bracket 212 may be configured as part of the outer housing of the storage adapter 210_M and may be configured to receive the opposite side surfaces of the storage device 230 to fix the opposite side surfaces of the storage device 230. For example, as illustrated in FIG. 6, the storage device 230 may be inserted into the carrier 211 through the opening and closing lever 213, and the opposite side surfaces of the storage device 230 may be fixed in a state of contacting the bracket 212. In an embodiment, one side surface of the bracket 212 may be connected to a ground voltage.

The opening and closing lever 213 may be formed on one surface through which the storage device 230 is inserted. For example, the opening and closing lever 213 may be hinge coupled to one end of the one surface through which the storage device 230 is inserted and may open and close the carrier 211 through a rotational operation of the hinge. That is, the opening and closing lever 213 may be coupled to the one end of the one surface through which the storage device is inserted by a hinge, and may open and close the carrier 211 through a rotation of the hinge. The opening and closing lever 213 may be opened to allow for the storage device to be inserted into the carrier 211, and may be closed once the storage device is inserted into the carrier 211.

In an embodiment, the opening and closing lever 213 may contact one surface of the storage device 230 through the rotational operation of the hinge so as to be physically connected to the storage device 230. The storage device 230 may generate the mode signal of the high level or the low level based on whether the physical connection with the opening and closing lever 213 is made.

For example, when the opening and closing lever 213 is in a closed state, that is, when the opening and closing lever 213 physically contacts the storage device 230, the storage device 230 may generate the mode signal of the low level. In this case, because it is possible to secure a time for the data dump operation even in the hot plug-out situation, the storage adapter 210_M may be used as an SSD for a server.

For example, when the opening and closing lever 213 is in an open state, that is, when the opening and closing lever 213 is physically separated from the storage device 230, the storage device 230 may generate the mode signal of the high level. In this case, the storage adapter 210_M may be used as an SSD for a user. In other words, when the mode signal switches from the low level to the high level, the use mode of the storage adapter 210_M may change from the SSD mode for the server to the SSD mode for the user.

As described above, the storage adapter 210_M according to an embodiment may open and close one surface of the carrier 211, through which the storage device 230 is inserted. Accordingly, the storage adapter 210_M may prevent the unintended detachment of the storage device 230 from the opening and closing lever 213. In an embodiment, because there is a need to open the opening and closing lever 213 to physically separate the storage device 230, the storage adapter 210_M may secure the delay time necessary to perform the data dump operation. Accordingly, the storage adapter 210_M according to an embodiment may be used as an SSD for server as well as an SSD for user.

FIG. 7 is a diagram illustrating an example of physical connection between an opening and closing module and a storage device in the storage adapter of FIG. 6 in detail, according to an embodiment. For convenience of description, like FIG. 6, it is assumed that one side surface of the bracket 212 (refer to FIG. 6) is connected to the ground voltage. In an embodiment, it is assumed that the mode signal generating circuit 234 is implemented by using a passive element such as a resistor.

Referring to FIG. 7, the opening and closing lever 213 may include a connector 214. In an embodiment, the connector 214 may be formed of a conductive material. For example, in an embodiment, the connector 214 may be formed of a metal material. The connector 214 may be provided on one surface of the opening and closing lever 213 so as to contact a switch SW of the storage device 230 through the rotational operation of the hinge.

The storage device 230 may include the mode signal generating circuit 234 and the memory controller 231, and the mode signal generating circuit 234 may include a resistor "R" and the switch SW.

In an embodiment, the mode signal generating circuit 234 may include the resistor "R" and the switch SW, and the resistor "R" and the switch SW may be connected to each other on one surface of a printed circuit board (PCB). A power supply voltage VDD may be provided to one end of the resistor "R", and a path in which a voltage of the mode signal is discharged to the ground voltage of the bracket 212 may be formed depending on whether the connector 214 and the switch SW contact each other.

For example, assuming that the opening and closing lever 213 is closed, because the connector 214 and the switch SW contact each other, the voltage level of the mode signal may be drained through the ground voltage of the bracket 212. In this case, the mode signal generating circuit 234 may generate the mode signal of the low level.

In an embodiment, for example, assuming that the opening and closing lever 213 is opened, because the connector 214 and the switch SW are separated from each other, the mode signal may be separated from the ground voltage, and thus, the voltage level of the mode signal may be charged with the power supply voltage VDD. In this case, the mode signal generating circuit 234 may generate the mode signal of the high level.

In an embodiment, when the opening and closing lever 213 is closed, the connector 214 electrically connects to the switch SW of the storage device 230_M to turn on the switch SW, and the mode signal generating circuit 234 may generate the mode signal of the high level. When the electrical connection between the connector 214 and the switch SW of the storage device 230_M is broken from the opening and closing lever 213 opening, the mode signal generating circuit 234 may generate the mode signal of the low level such that the storage adapter 230_M performs the data dump operation to transfer data stored in the buffer memory 232 of the storage device 230_M to, for example, the first nonvolatile memory 233_1 of the storage device 230_M before the storage device 230_M is physically removed from the bracket 212 of the carrier 211. In other words, the configuration allows the data dump operation to occur during the given delay time between opening the opening and closing lever 213 and the physical removal of the storage device 230_M from the bracket 212 of the carrier 211.

As described above, the storage device 230 according to an embodiment may generate the mode signal of the high level or the low level based on whether the contact with the connector 214 of the opening and closing lever 213 is made.

FIGS. 8A to 8E are diagrams illustrating examples in which a storage device is installed in a carrier of a storage adapter of FIG. 6 and is taken out, according to various embodiments. For convenience of description, like FIGS. 6 and 7, it is assumed that the ground voltage is connected to one side surface of the bracket 212 and a path for discharging the mode signal is formed or is blocked depending on the rotation of the opening and closing lever 213.

Referring to FIG. 8A, the storage device 230 may be inserted into the carrier 211.

In this case, because the storage device 230 is in a state of being not joined to the carrier 211, the storage device 230 may be in a state where a power is not yet supplied to the storage device 230. Accordingly, the mode signal may be in an unknown state.

Referring to FIG. 8B, the storage device 230 may be inserted into the carrier 211, but the opening and closing lever 213 may be in an open state.

In this case, the level of the mode signal may be determined depending on whether the host 100 (refer to FIG. 1) provides the power to the storage device 230. For example, in an embodiment, when the host 100 does not provide the power to the storage device 230, the mode signal may be in an unknown state. For example, in an embodiment, when the host 100 provides the power to the storage device 230, the mode signal may be at the high level.

Referring to FIG. 8C, the storage device 230 may be inserted into the carrier 211, and the opening and closing lever 213 may be in a closed state. In this case, a discharge path in which the voltage of the mode signal is drained through the opening and closing lever 213 may be formed. Accordingly, the mode signal may be at the low level.

In this case, the storage device 230 may be provided with the power through the power supply 120 (refer to FIG. 3A) or the auxiliary power supply 140 (refer to FIG. 3A) of the host 100A. That is, the storage device 230 may stably protect data even in the typical sudden power-off (SPO) event. In an embodiment, even though the hot plug-out even occurs, the storage device 230 may secure the delay time through the opening and closing of the opening and closing lever 213 and may stably protect data by performing the data dump operation by using the delay time.

Accordingly, when the mode signal is at the low level, the storage device 230 may be used as an SSD for a server, and the host 100 may set the use mode of the storage device 230 as the SSD mode of a server.

Referring to FIG. 8D, the opening and closing lever 213 of the storage device 230 may be opened. The opening and closing lever 213 of the storage device 230 may be opened, for example, to replace an SSD. In this case, the discharge path in which the voltage of the mode signal is drained through the opening and closing lever 213 may be blocked. Accordingly, the mode signal may switch from the low level to the high level.

In this case, the memory controller 231 of the storage device 230 may provide the host 100 with information indicating that the mode signal is switched. The host 100 may determine that the storage device 230 is to be taken out from the carrier 211 and may change the use mode of the storage device 230 to the SSD mode for user. In this case, when data are stored in the volatile memory of the storage device 230, the host 100 may control the storage device 230 to perform the data dump operation.

Referring to FIG. 8E, because the use mode of the storage device 230 is the SSD mode for the user, the storage device 230 may be removed from the storage system 10A (refer to FIG. 1) any time.

The detail description is provided as an example, and it may be understood that the various embodiments may be variously changed and applied. Below, various variations or applications of the various embodiments will be described in detail.

FIG. 9 is a diagram illustrating an example of a storage adapter of the storage system of FIG. 1, according to an embodiment. For convenience of description, the storage device 230 and the opening and closing lever 213 are only illustrated in FIG. 9. A storage adapter of FIG. 9 is similar to a storage adapter of FIG. 7. Thus, the same or similar components may be marked by the same or similar reference numerals/signs, and additional description associated with the same or similar components will be omitted to omitted redundancy and for conciseness.

Referring to FIG. 9, the opening and closing lever 213 may include the connector 214. The mode signal generating circuit 234 may include the resistor "R" and the switch SW. A first end of the resistor "R" may be connected to the power supply voltage VDD, a first end of the switch SW may be connected to the ground voltage, and the ground voltage may be formed within the storage device 230. That is, a discharge path for draining the mode signal may be formed within the storage device 230.

In this case, the storage device 230 according to an embodiment may generate the mode signal of the high level or the low level based on whether the contact with the connector 214 of the opening and closing lever 213 is made. In other words, the contact between the connector 214 and the switch SW may close the switch SW.

FIG. 10 is a diagram illustrating an example of a storage adapter of the memory system of FIG. 1, according to an embodiment. A storage adapter of FIG. 10 is similar to a storage adapter of FIG. 9. Thus, the same or similar components may be marked by the same or similar reference numerals/signs, and additional description associated with the same or similar components will be omitted to omitted redundancy and for conciseness.

Referring to FIG. 10, the storage adapter 210_M may further include an LED 215. The memory controller 231 may control the LED 215 such that a data dump progress situation and a connection state are provided to the user.

According to an embodiment, the memory controller 231 may express the data dump progress situation in a manner of turning off the LED 215 while the data dump operation is performed and turning on the LED 215 when the data dump operation is completed. In an embodiment, the memory controller 231 may display the physical connection state of the opening and closing lever 213 and the storage device 230 by using a light of a color different from a color expressing the data dump progress situation.

As described above, since the storage adapter 210_M includes the LED 215, the storage adapter 210_M may intuitively inform the user of the data dump progress situation and the connection state.

In the various embodiment described with respect to FIGS. 4 to 10, the description is given that the mode signal generating circuit is implemented within a storage device. However, this configuration is only an example, and embodiments are not limited thereto. For example, as will be described with reference to FIG. 11, a mode signal generating circuit may be formed within the carrier.

FIGS. 11A and 11B are diagrams illustrating examples of a storage adapter of the storage system of FIG. 1, according to various embodiments. A storage adapter of FIGS. 11A and 11B is similar to a storage adapter of FIG. 9. Thus, the same or similar components may be marked by the same or similar reference numerals/signs, and additional description associated with the same or similar components will be omitted to omitted redundancy and for conciseness.

Referring to FIG. 11A, the storage adapter 210_M may include a mode signal generating circuit 234_1, and the mode signal generating circuit 234_1 may be formed in the carrier 211, rather than in the storage device 230. In an embodiment, as illustrated in FIG. 11A, the mode signal generating circuit 234_1 may be formed in the opening and closing lever 213 of the carrier 211.

In this case, in an embodiment, the mode signal generating circuit 234_1 may include an active element. That is, compared to the case where the mode signal generating circuit 234 of the storage adapter 210_M forms a discharge path by using a passive element such as the resistor "R", the mode signal generating circuit 234_1 of the storage adapter 210_M of FIG. 10 may check a connection state of the opening and closing lever 213 and the storage device 230 by using an active element. For example, the mode signal generating circuit 234_1 may be implemented with a circuit that detects whether an electrical contact between one end of the storage device 230 and the opening and closing lever 213 is made and may include at least one active element and/or at least one passive element.

In this case, the mode signal generating circuit 234_1 may generate the mode signal of the low level or the high level based on whether the electrical contact between one end of the storage device 230 and the opening and closing lever 213 is made. The mode signal generating circuit 234_1 may transmit the generated mode signal to the host 100, and the host 100 may set the use mode of the storage device 230 based on the received mode signal.

In an embodiment, when the electrical contact between one end of the storage device 230 and the opening and closing lever 213 is made, the mode signal generating circuit 234_1 may generate the mode signal of the low level and may transmit the mode signal of the low level to the host 100. The host 100 may set the use mode of the storage device 230 as the SSD mode for the server based on the mode signal of the low level and may transmit a command CMD including information about the set mode to the memory controller 231 of the storage device 230. The storage device 230 may operate as an SSD for the server based on the command CMD.

In an embodiment, when one end of the storage device 230 and the opening and closing lever 213 are electrically separated from each other, the mode signal generating circuit 234_1 may change the level of the mode signal from the low level to the high level and may transmit the changed mode signal to the host 100. The host 100 may change the use mode of the storage device from the SSD mode for the server to the SSD mode for the user based on the mode signal of the high level and may transmit the command CMD including information about the changed mode to the memory controller 231 of the storage device 230. The use mode of the storage device 230 may be changed from the SSD mode for server to the SSD mode for user based on the command CMD.

However, embodiments are not limited thereto. For example, the mode signal generating circuit 234_1 may be implemented to provide the mode signal to the memory controller 231. For example, as illustrated in FIG. 11B, the mode signal generating circuit 234_1 may generate the mode signal of the low level or the high level based on whether the electrical contact between one end of the storage device 230 and the opening and closing lever 213 is made and may transmit the generated mode signal to the memory controller 231. In this case, the memory controller 231 may transmit the command CMD including information about the mode signal to the host 100, and the host 100 may set the use mode of the storage device 230 based on the information about the mode signal thus received. Afterwards, the host 100 may transmit the command CMD including information about the set mode to the memory controller 231 of the storage device 230.

FIG. 12 is a block diagram of a storage system according to an embodiment. A storage system 10B of FIG. 12 is similar to the storage system 10A of FIG. 1. Thus, the same or similar components may be marked by the same or similar reference numerals/signs, and additional description associated with the same or similar components will be omitted to omitted redundancy and for conciseness.

In FIGS. 1 to 11, the description is given as the mode signal is generated by a storage device and the mode signal generated by the storage device is provided to the host 100 by a memory controller of the storage device. However, this configuration is only an example, and embodiments are not limited thereto.

For example, as illustrated in FIG. 12, the host 100 may include a status monitor 180, and the status monitor 180 may monitor the voltage level of the mode signal of the storage device. When the voltage level of the mode signal is changed from the low level to the high level, the status monitor 180 may detect the change in the voltage level of the mode signal. Based on the changed voltage level of the mode signal, the host 100 may control the storage device such that the use mode of the storage device is changed from the SSD mode for server to the SSD mode for user.

FIG. 13 is a block diagram of a storage system according to an embodiment. A storage system 10C of FIG. 13 is similar to the storage system 10B of FIG. 12. Thus, the same or similar components may be marked by the same or similar reference numerals/signs, and additional description associated with the same or similar components will be omitted to omitted redundancy and for conciseness.

In FIGS. 1 to 12, the description is given in which one storage device is installed in one carrier. However, this configuration is only an example, and embodiments are not limited thereto.

For example, as illustrated in FIG. 13, a first storage adapter 210_1 may include a first carrier 211_1, and a plurality of storage devices 230_11 to 230_1k may be installed in the first carrier 211_1. In an embodiment, the plurality of storage devices 230_11 to 230_1k may include a first storage device 230_11, . . . , and a k-th storage device 230_1k.

FIG. 14 is a diagram indicating a data center to which a storage system according to an embodiment is applied.

Referring to FIG. 14, a data center 3000 which is a facility collecting various kinds of data and providing services may be referred to as a "data storage center". The data center 3000 may be a system for operating a search engine and a database, and may be a computing system used by companies, such as banks, or government agencies. The data center 3000 may include application servers 3100 to 3100n and storage servers 3200 to 3200m. The number of application servers 3100 to 3100n and the number of storage servers 3200 to 3200m may be variously selected according to embodiments. The number of application servers 3100 to 3100n may be different from the number of storage servers 3200 to 3200m.

The application server 3100 may include at least one processor 3110 and at least one memory 3120. The storage server 3200 may include at least one processor 3210 and at least one memory 3220. The storage server 3200 will now be described as an example. The processor 3210 may control all operations of the storage server 3200, may access the memory 3220, and may execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some embodiments, the numbers of processors 3210 and memories 3220 included in the storage server 3200 may be variously selected. In an embodiment, the processor 3210 and the memory 3220 may provide a processor-memory pair. In an embodiment, the number of processors 3210 may be different from the number of memories 3220. The processor 3210 may include a single-core processor or a multi-core processor. The above description of the storage server 3200 may be similarly applied to the application server 3100. According to an embodiment, the application server 3100 may not include a storage device 3150. In other words, in an embodiment, the storage device 3150 may be omitted from the application server 3100. The storage server 3200 may include at least one storage device 3250. The number of storage devices 3250 included in the storage server 3200 may be variously selected according to embodiments.

The application servers 3100 to 3100n may communicate with the storage servers 3200 to 3200m through a network 3300. The network 3300 may be implemented by using a fiber channel (FC) or Ethernet. In this case, the FC may be a medium used for relatively high-speed data transmission and use an optical switch with high performance and high availability. The storage servers 3200 to 3200m may be provided as file storages, block storages, or object storages according to an access method of the network 3300.

In an embodiment, the network 3300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In an embodiment, the network 3300 may be a general network, such as a TCP/IP network. For example, the network 3300 may be implemented according to a protocol, such as FC over Ethernet (FCOE), network attached storage (NAS), and NVMe over Fabrics (NVMe-oF).

Below, the application server 3100 and the storage server 3200 will mainly be described. A description of the application server 3100 may be applied to another application server 3100n, and a description of the storage server 3200 may be applied to another storage server 3200m.

The application server 3100 may store data, which are requested by a user or a client to be stored, in one of the storage servers 3200 to 3200m through the network 3300. In an embodiment, the application server 3100 may obtain data, which are requested by the user or the client to be read, from among one of the storage servers 3200 to 3200m through the network 3300. For example, the application server 3100 may be implemented as a web server or a database management system (DBMS).

The application server 3100 may access a memory 3120n or a storage device 3150n, which is included in another application server 3100n, through the network 3300. In some embodiments, the application server 3100 may access memories 3220 to 3220m or storage devices 3250 to 3250m, which are included in the storage servers 3200 to 3200m, through the network 3300. Thus, the application server 3100 may perform various operations on data stored in application servers 3100 to 3100n and/or the storage servers 3200 to 3200m. For example, the application server 3100 may execute an instruction for moving or copying data between the application servers 3100 to 3100n and/or the storage servers 3200 to 3200m. In this case, the data may be moved from the storage devices 3250 to 3250m of the storage servers 3200 to 3200m to the memories 3120 to 3120n of the application servers 3100 to 3100n directly or through the memories 3220 to 3220m of the storage servers 3200 to 3200*m*. The data moved through the network 3300 may be data encrypted for security or privacy.

The storage server 3200 will now be described as an example. An interface (I/F) 3254 may provide physical connection between the processor 3210 and a controller (CTRL) 3251 and a physical connection between an NIC 3240 and the controller 3251. For example, the interface 3254 may be implemented by using a direct attached storage (DAS) scheme in which the storage device 3250 is directly connected with a dedicated cable. In an embodiment, for example, the interface 3254 may be implemented by using various interface schemes, such as ATA, SATA, e-SATA, an SCSI, SAS, PCI, PCIe, NVMe, IEEE 1394, USB, SD card, MMC (Multi-Media Card), eMMC, UFS (Universal Flash Storage), eUFS (embedded Universal Flash Storage), and CF (Compact Flash) card.

The storage server 3200 may further include a switch 3230 and the NIC 3240. The switch 3230 may selectively connect the processor 3210 to the storage device 3250 or selectively connect the NIC 3240 to the storage device 3250 via the control of the processor 3210. As in the above description, the application server 3100 may further include a switch 3130 and an NIC 3140.

In an embodiment, the NIC 3240 may include a network interface card and a network adapter. The NIC 3240 may be connected to the network 3300 by a wired interface, a wireless interface, a Bluetooth interface, or an optical interface. The NIC 3240 may include an internal memory, a DSP, and a host bus interface and be connected to the processor 3210 and/or the switch 3230 through the host bus interface. The host bus interface may be implemented as one of the above-described examples of the interface 3254. In an embodiment, the NIC 3240 may be integrated with at least one of the processor 3210, the switch 3230, and the storage device 3250.

In the storage servers 3200 to 3200*m* or the application servers 3100 to 3100*n*, a processor may transmit a command to storage devices 3150 to 3150*n* and 3250 to 3250*m* or the memories 3120 to 3120*n* and 3220 to 3220*m* and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 3150 to 3150*n* and 3250 to 3250*m* may transmit a control signal and a command/address signal to NAND flash memory devices 3252 to 3252*m* in response to a read command received from the processor. Thus, when data is read from the NAND flash memory devices 3252 to 3252*m*, a read enable (RE) signal may be input as a data output control signal, and thus, the data may be output to a DQ bus. A data strobe signal DQS may be generated by using the RE signal. The command and the address signal may be latched in a page buffer depending on a rising edge or falling edge of a write enable (WE) signal.

The controller (CTRL) 3251 may control all operations of the storage device 3250. In an embodiment, the controller 3251 may include an SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210*m* of another storage server 3200*m*, or the processors 3110 and 3110*n* of the application servers 3100 and 3100*n*. A DRAM 3253 may temporarily store (or buffer)

data to be written to the NAND flash memory device 3252 or data read from the NAND flash memory device 3252. In an embodiment, the DRAM 3253 may store metadata. Herein, the metadata may be user data or data generated by the controller 3251 to manage the NAND flash memory device 3252. The storage device 3250 may include a reset signal generator (RSG) 3255 and may be implemented to prevent abnormal reset-off and to improve the reliability of product.

The storage devices 3150 to 3150*m* and 3250 to 3250*m* may include the storage adapter according to one or more of the various embodiments described with reference to FIGS. 1 to 14.

A storage device and a storage adapter may effectively prevent the loss of data even in a sudden power-off situation such as a hot plug-out situation.

While the present disclosure has been described with reference to various embodiments thereof, it will be apparent to those of ordinary skill in the art that various changes and modifications may be made thereto without departing from the spirit and scope of the present disclosure as set forth in the following claims.

What is claimed is:

1. A storage adapter comprising:
a storage device configured to store data; and
a carrier including a bracket configured to removably receive the storage device and an opening and closing lever connected to the bracket,
wherein the storage device comprises:
a buffer memory including a volatile memory;
at least one nonvolatile memory;
a memory controller configured to control the buffer memory and the at least one nonvolatile memory; and
a mode signal generating circuit configured to generate a mode signal, based on a connection state of the storage device and the carrier that is indicated by a rotational operation of the opening and closing lever with respect to the bracket, and
wherein, based on a level of the mode signal, the memory controller selectively performs a data dump operation such that the data stored in the buffer memory are stored in the at least one nonvolatile memory.

2. The storage adapter of claim 1, wherein, when the storage device and one end of the carrier are separated from each other by the rotational operation, the mode signal generating circuit generates the mode signal of a high level, and
wherein the storage device operates in an SSD mode for a user, based on the mode signal of the high level.

3. The storage adapter of claim 2, wherein, when the mode signal is the high level, the memory controller performs the data dump operation such that the data stored in the buffer memory are stored in the at least one nonvolatile memory.

4. The storage adapter of claim 1, wherein, when the storage device and one end of the carrier are connected to each other by the rotational operation, the mode signal generating circuit generates the mode signal of a low level, and
wherein the storage device operates in an SSD mode for a server, based on the mode signal of the low level.

5. The storage adapter of claim 1, wherein:
the bracket is configured to constitute at least a portion of an outer housing of the storage adapter and to receive the storage device to fix the storage device; and

the opening and closing lever is configured to open and close the carrier through the rotational operation after the storage device is received into the bracket.

6. The storage adapter of claim 5, wherein the carrier further includes:

an LED configured to display the connection state of the storage device and the carrier.

7. The storage adapter of claim 5, wherein the mode signal generating circuit includes:

a resistor including a first end connected to a power supply voltage; and a switch including a first end connected to a second end of the resistor and a second end connected to a ground voltage, and wherein the opening and closing lever includes a connector that is physically connected to or disconnected from the switch according to the rotational operation of the opening and closing lever.

8. The storage adapter of claim 7, wherein, when the connector of the opening and closing lever contacts the switch of the storage device, the resistor and the ground voltage are electrically connected to each other, and the mode signal generating circuit generates the mode signal of a low level.

9. The storage adapter of claim 7, wherein, when the connector of the opening and closing lever is separated from the switch of the storage device, the resistor is electrically separated from the ground voltage, and the mode signal generating circuit generates the mode signal of a high level.

10. The storage adapter of claim 7, wherein the bracket is formed of a conductive material, and the ground voltage is connected to the bracket.

11. The storage adapter of claim 1, wherein the memory controller includes:

a host interface configured to perform interfacing with a host; and a status monitor configured to monitor the level of the mode signal, and wherein the memory controller transmits information about the level of the mode signal to the host through the host interface.

12. The storage adapter of claim 1, wherein the mode signal generating circuit is disposed in the carrier, and wherein the mode signal generating circuit transmits information about the level of the mode signal to a host.

13. A storage device which is removably installed in a carrier including a bracket configured to removably receive the storage device and an opening and closing lever connected to the bracket, the storage device comprising:

a buffer memory including a volatile memory;

at least one nonvolatile memory;

a memory controller configured to control the buffer memory and the at least one nonvolatile memory; and a mode signal generating circuit configured to generate a mode signal based on a connection state of the storage device and the carrier that is indicated by a rotational operation of the opening and closing lever with respect to the bracket, wherein, based on a level of the mode signal, the memory controller selectively performs a data dump operation such that data stored in the buffer memory are stored in the at least one nonvolatile memory.

14. The storage device of claim 13, wherein, when the storage device and one end of the carrier are separated from each other by the rotational operation, the mode signal generating circuit generates the mode signal of a high level, and wherein the storage device operates in an SSD mode for a user, based on the mode signal of the high level.

15. The storage device of claim 14, wherein, when the mode signal is at the high level, the memory controller performs the data dump operation such that the data stored in the buffer memory are stored in the at least one nonvolatile memory.

16. The storage device of claim 14, wherein, when the storage device and the one end of the carrier are connected to each other by the rotational operation, the mode signal generating circuit generates the mode signal of a low level, and wherein the storage device operates in an SSD mode for a server, based on the mode signal of the low level.

17. An operation method of a storage device which is removably received in a carrier including a bracket configured to removably receive the storage device and an opening and closing lever connected to the bracket, the operation method comprising:

setting a use mode of the storage device as a first mode;

detecting a level of a mode signal generated based on a connection state of the storage device and the carrier that is indicated by a rotational operation of the opening and closing lever with respect to the bracket; and selectively performing a data dump operation based on the level of the mode signal such that data stored in a buffer memory of the storage device are stored in a nonvolatile memory of the storage device.

18. The operation method of claim 17, further comprising:

when the level of the mode signal is at a high level, changing the use mode of the storage device from the first mode to a second mode, wherein the first mode is a mode in which the storage device is used as an SSD for a server, and the second mode is a mode in which the storage device is used as an SSD for a user.

19. The operation method of claim 18, wherein, when the storage device and one end of the carrier are separated from each other by the rotational operation, the level of the mode signal is the high level, and wherein, when the storage device and the one end of the carrier are connected to each other, the level of the mode signal is a low level.

* * * * *